Nov. 22, 1966   J. A. SHROPSHIRE ETAL   3,287,172
ELECTRODE AND METHOD FOR PREPARATION THEREOF
Filed May 29, 1962
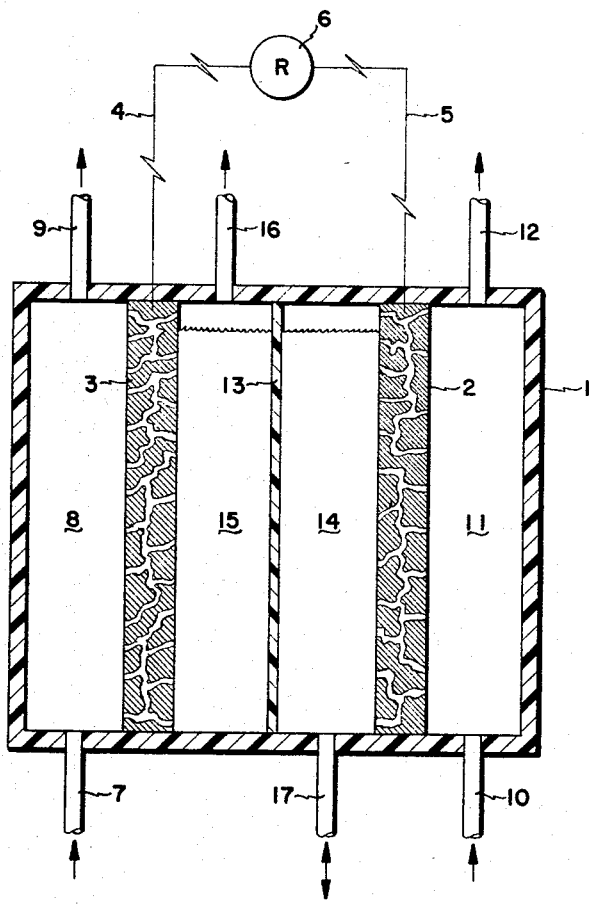
Joseph A. Shropshire
Charles E. Thompson   INVENTORS
BY Olin B. Johnson
PATENT ATTORNEY

United States Patent Office 3,287,172
Patented Nov. 22, 1966

3,287,172
ELECTRODE AND METHOD FOR PREPARATION THEREOF
Joseph A. Shropshire, Scotch Plains, and Charles E. Thompson, Fanwood, N.J., assignors to Esso Research and Engineering Company, a corporation of Delaware
Filed May 29, 1962, Ser. No. 198,677
5 Claims. (Cl. 136—122)

This invention relates to direct conversion of chemical energy to electrical energy. In particular, this invention relates to novel catalyst-bearing nonsacrificial electrodes for use in electrochemical cells wherein a combustible material is electrochemically oxidized and to the preparation of catalysts associated therewith. More particularly, the invention relates to fuel cells employing aqueous electrolytes and to the preparation of catalyst-bearing electrodes for use therein which comprise a carbon substrate upon which a noble metal catalyst is superimposed.

The term "fuel cell" is used herein and in the art to denote a device, system or apparatus wherein chemical energy of a fluid combustible fuel such as hydrogen, carbon monoxide or an organic compound containing hydrogen in its molecular structure is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode, respectively, which are separated by an electrolyte which provides ionic conductance therebetween, conduction means for electrical connection between such anode and cathode external to such electrolyte, means for admitting a fluid fuel into dual contact with the anode and electrolyte and means for admitting an oxidant into dual contact with the cathode and electrolyte. Where necessary or desired, the electrolyte compartment is divided into an anolyte compartment and a catholyte compartment by an ion-permeable partition or ion-exchange membrane. Thus, in each such cell a fuel is oxidized at the anode and an oxidant is reduced at the cathode upon receiving electrons from such cathode.

Electrodes of the type hereinbefore and hereinafter referred to are also employed in electrolytic cells which unlike the aforementioned fuel cells do not provide a net production of electrical energy but in which a combustible fuel is oxidized electrochemically at the anode thereof. In such cells a direct current of electrical energy from an external source, i.e. a fuel cell, a storage battery or an alternating current rectifier, is admitted to the electrical circuit of the cell in lieu of supplying an oxidant to the cathode as in the fuel cell operation. In such cells make-up water is added to the electrolyte while the cell is in continuous operation.

Carbon comprising electrodes are well known in the art. Various methods have been advanced for impregnating or surfacing such electrodes with a metal catalyst that will accelerate the half-cell reaction for which the electrode is intended. Heretofore, one of the most effective methods for impregnating a carbon mass with a metal catalyst has been by soaking such mass in an aqueous solution of a water soluble compound containing in combined form the desired metal, heating the resulting mass under nitrogen, or other gas, at a temperature of about 700° to 1000° F. to decompose the adsorbed and/or absorbed compound, and finally heating such mass in a reducing atmosphere, e.g. hydrogen, at a temperature of about 700° to 1000° F. until the adsorbed and/or absorbed metal ions are reduced to the corresponding elemental metal. The total metal content of the completed electrodes should be above about 0.1 weight percent and ordinarily will be in the range of about 0.5 to 5, preferably about 0.7 to 2.5 weight percent.

It now has been discovered that the effectiveness of electrodes prepared as above described is surprisingly enhanced if the hydrogen treating step is carried out at a temperature in the range of about 1200° to 1800° F., preferably 1400° to 1700° F., and most preferably 1550° to 1650° F.

Carbon electrodes may take on a variety of shapes, e.g. porous plates or cylinders, in accordance with the design of the cell wherein their use in intended. Such electrodes prior to catalyst impregnation may consist essentially of a porous carbon mass or the carbon mass may be employed on or within other supporting structures, e.g. ceramics, metals, etc.

The preparation of carbon structures for use as electrodes or electrode base materials is well known in the art and need not be discussed here in detail. They are commonly prepared by taking finely ground carbon particles, e.g. mixtures of amorphous carbon and graphite, mixing these with a suitable binder such as pitch, shaping the resulting mass into the desired final configuration and subjecting the same to high temperatures and pressures over extended periods of time. Ordinarily, the commercially prepared carbon mass is heated in carbon dioxide prior to catalyst impregnation to achieve the porosity desired for electrode use.

In accordance with this invention the noble metal catalysts employed are preferably platinum comprising catalysts. These include embodiments wherein platinum is the sole metal employed and those wherein one or more other metals are employed in addition to platinum. Where more than one metal is employed the water-soluble compounds containing such metals may be dissolved in a common solution, or, in the alternative, the carbon may be alternately soaked in separate solutions.

The process of this invention is applicable to both anodes and cathodes, e.g. the so-called fuel and oxygen electrodes, and provides increased effectiveness over prior processes with comparable grades of carbon impregnated with the same metals in both the oxidation of fuel and reduction of oxidant. It is particularly effective in the preparation of anodes for both fuel cells and electrolytic cells where the anode performs the same function as the fuel electrode of a fuel cell.

The accompanying drawing provides a schematic view of a simple fuel cell wherein the electrodes of this invention may be tested. Referring now to the drawing, inside vessel 1 is positioned cathode 2 and anode 3 which are electrically connected by wires 4 and 5 and resistance means 6 which is symbolic of any appliance or device utilizing direct electric current for power. Fuel inlet conduit 7 provides means for admitting a gaseous fuel, e.g. hydrogen gas, hydrocarbon gas, etc. to fueling zone 8 and thence into dual contact with anode 3 and the electrolyte. Fuel exhaust conduit 9 is provided as means for releasing carbon dioxide or partial oxidation products formed in anodic oxidation of the organic fuel. Oxidant inlet conduit 10 provides means for introducing an oxidant, e.g. air, oxygen gas, etc. into oxidant receiving zone 11 and thence to cathode 2 where dual contact with the cathode and the electrolyte is established. Oxidant exhaust conduit 12 provides exhaust means for releasing excess oxidant and unused inert gases such as nitrogen when air is used as the oxidizing gas. Cathode 2 is a porous carbon plate impregnated with platinum and gold. Anode 3, the fuel electrode, is here shown as a porous carbon plate which likewise is impregnated with a platinum comprising catalyst, e.g. platinum and iridium, Here the electrolyte compartment formed by vessel 1 is divided by electrolyte partition 13 into a catholyte compartment 14 and an anolyte compartment 15. Partition 13 may be an ion-exchange membrane or suitable ion-permeable structure where it is desirable to limit migration of fuel from the anolyte to the proximity of the cathode. In other embodiments the partition may be dispensed with altogether, e.g. as where the fuel either does not reach or materially affect the cathodic half cell. Anolyte compartment 15 contains an aqueous electrolyte, e.g. sulfuric acid, phosphoric acid, potassium hydroxide, etc. Catholyte compartment 14 also contains an aqueous electrolyte which may be the same or different from that in compartment 15 and of the same or different concentration, e.g. phosphoric acid, sulfuric acid, mixtures of sulfuric acid and other acids, etc.

The invention will be more easily understood from the following examples which are for purposes of illustration only and should not be construed as limitations upon the true scope of the invention as set forth in the claims.

*Example 1*

Porous carbon cylinders having a porosity of about 30% were heated to a temperature of about 750° F. in air to make the carbon surfaces more hydrophilic. They were then placed under reduced pressure, e.g. about 0.001 to .05 atmospheres, to facilitate the penetration of a treating solution through the porous structure. The cylinders were then soaked in an aqueous solution containing chloroplatinic acid and iridium trichloride. The ratio of platinum to iridium in this solution was about 9:1 and the total concentration of the two metal-containing compounds in the solution was about 5 weight percent. The pressure was then returned to atmospheric pressure and the cylinders were soaked in the solution for about 5 to 6 hours at 180° F. The cylinders were then dried at about 230° F. overnight and then heated to about 900° F. under nitrogen for about 2 hours to decompose the adsorbed and/or absorbed metal-containing compounds. The electrodes were then divided into six groups and each group was placed in a hydrogen atmosphere for about 4 hours at varying temperatures. The electrodes were tested as fuel cell anodes. The anodic half cell was operated with a 30 weight percent aqueous sulfuric acid electrolyte, a temperature of about 180° F. at one atmosphere and an organic fuel, i.e. ethane gas, was electrochemically oxidized at such anode. The results of these tests are set forth in the following table:

TABLE I.—EFFECT OF REDUCING GAS TEMPERATURE ON ANODE PERFORMANCE OF Pt-Ir CATALYZED CARBON ELECTRODE WITH ETHANE FUEL

| Electrode | Hydrogen Treating Temp., ° F. | Amps./Ft.$^2$ at Indicated Polarization From Theoretical Voltage | |
|---|---|---|---|
| | | 0.5 Volts | 0.6 Volts |
| A | 1,000 | 3.0 | 5.5 |
| B | 1,200 | 3.7 | 7.3 |
| C | 1,400 | 4.6 | 9.1 |
| D | 1,600 | 5.4 | 11.0 |
| E | 1,800 | 3.2 | 6.8 |
| F | 2,000 | 0.2 | 1.3 |

Ethane was chosen as the testing fuel since saturated hydrocarbons have proven to be a most difficult fuel to oxidize in fuel cell operations.

*Example 2*

The electrodes tested in Example 1 were tested as fuel cell cathodes using the high and low temperature controls and the electrode prepared at 1600° F. which had proven best for fuel electrode use. The cathodic half cell was operated at the same conditions as the anodic half cell in Example 1 and oxygen gas was employed as the oxidant. This was reduced at the cathode in contrast to the oxidation of ethane at the anode in Example 1. The temperatures employed in electrode preparation and the results obtained are set forth in the following table:

TABLE II.—EFFECT OF REDUCING GAS TEMPERATURE ON CATHODE PERFORMANCE OF Pt-Ir CATALYZED CARBON ELECTRODE

| Electrode | Hydrogen Treating Temp., ° F. | Polarization From Theoretical Voltage [1] at Indicated Amps./Ft.$^2$ in Volt | | | |
|---|---|---|---|---|---|
| | | 10 | 50 | 100 | 200 |
| A | 1,000 | .23 | .33 | .43 | .63 |
| D | 1,600 | .23 | .33 | .43 | .60 |
| F | 2,000 | .42 | .61 | .71 | [2] |

[1] 1.21 volts vs. standard hydrogen electrode.
[2] Limiting current density less than 200 amps./ft.$^2$ Although the improvement achieved is not as great for cathodic use as for anodic use, the performance level is maintained and some improvement is achieved.

*Example 3*

A further test was carried out to determine whether or not the improvement achieved in the preceding examples was solely attributable to temperature as such, or, whether such improvement resulted from the employment of such temperatures in the presence of hydrogen. One electrode was prepared in accordance with the method described in detail in Example 1 except that the heating under a nitrogen blanket was carried out at 1600° F. and followed by hydrogen reduction at 900° F. A second electrode was prepared in the same manner as Electrode D of Example 1, i.e. nitrogen at 900° F. followed by hydrogen at 1600° F. These two electrodes were then tested in accordance with the procedure employed in Example 1 with ethane fuel. In initial performance the electrode treated with nitrogen at 1600° F. produced an activity as high as that of the electrode receiving the 1600° F. hydrogen treat. However, the current density of the electrode receiving the 1600° F. nitrogen treat declined with use at a given polarization, whereas the activity of the electrode receiving the 1600° F. hydrogen treat remained constant.

*Example 4*

Carbon electrodes that had been burned out with $CO_2$ were impregnated with a solution containing about 5% chloroplatinic acid and 0.25% gold chloride. The total metal content of the completed electrode being about 1-2 weight percent. They were dried and two were treated at 1000° F. under $N_2$ for 1 hour and under $H_2$ for 4 hours. Two were treated at 1600° F. under $N_2$ for 1 hour and under $H_2$ for 4 hours. They were tested as anodes in a fuel cell using ethane as fuel at 180° F. and in 30% $H_2SO_4$ as electrolyte. The current density of the electrode reduced at 1600° F. was higher than that reduced at 1000° F. at a given polarization.

TABLE III.—EFFECT OF TEMPERATURE OF HYDROGEN TREAT

| Treat Temp., ° F. | Current Density in Amps./Ft.$^2$ at Indicated Polarization from Theory, Volts | | |
|---|---|---|---|
| | 0.4 | 0.5 | 0.6 |
| 1,000 | 1.6 | 4.0 | 6.8 |
| 1,600 | 2.1 | 5.5 | 8.8 |

The term "polarization" wherever employed in this specification refers to the difference between observed voltage and the voltage of a reversible electrode operating with the same reactant, temperature, pressure, and electrolyte. It does not refer to the difference between observed voltage and open circuit voltage (rest potential).

What is claimed is:

1. In the preparation of a non-sacrificial carbon electrode impregnated with a noble metal catalyst which preparation comprises soaking a carbon structure in an aqueous solution of a water-soluble compound containing said noble metal and subsequently heating the resulting impregnated carbon structure, the improvement which comprises heating said impregnated carbon structure in an atmosphere consisting essentially of hydrogen gas at a temperature in the range of about 1200° to 1800° F. until the noble metal component of said compound is reduced to elemental noble metal.

2. A method in accordance with claim 1 wherein said impregnated carbon structure is heated in an atmosphere consisting essentially of hydrogen gas at a temperature in the range of about 1550° to 1650° F.

3. A method in accordance with claim 1 wherein said catalyst comprises platinum.

4. A method in accordance with claim 1 wherein said catalyst comprises at least 0.1 weight percent of the complete electrode.

5. In the preparation of a nonsacrificial carbon anode impregnated with a platinum—iridium catalyst which preparation comprises soaking a porous carbon cylinder in an aqueous solution containing chloroplatinic acid and iridium trichloride and subsequently heating the resulting impregnated porous carbon cylinder, the improvement which comprises heating said impregnated cylinder in an atmosphere consisting essentially of hydrogen gas at a temperature of about 1600° F. for about four hours.

References Cited by the Examiner
UNITED STATES PATENTS

| | | | |
|---|---|---|---|
| 2,928,891 | 3/1960 | Justi et al. | 136—86 |
| 2,980,749 | 4/1961 | Broers | 136—86 |
| 3,071,637 | 1/1963 | Horn et al. | 136—122 |
| 3,077,507 | 2/1963 | Kordesch | 136—121 |
| 3,097,974 | 7/1963 | McEvoy et al. | 136—120 |

JOHN H. MACK, *Primary Examiner.*

W. VAN SISE, *Assistant Examiner.*